July 4, 1939.  W. S. BRINK  2,164,984
TIRE RIM
Filed June 20, 1931  2 Sheets-Sheet 1

INVENTOR
WINFIELD S. BRINK.
BY
Ely & Barrow
ATTORNEYS

July 4, 1939.  W. S. BRINK  2,164,984
TIRE RIM
Filed June 20, 1931   2 Sheets-Sheet 2
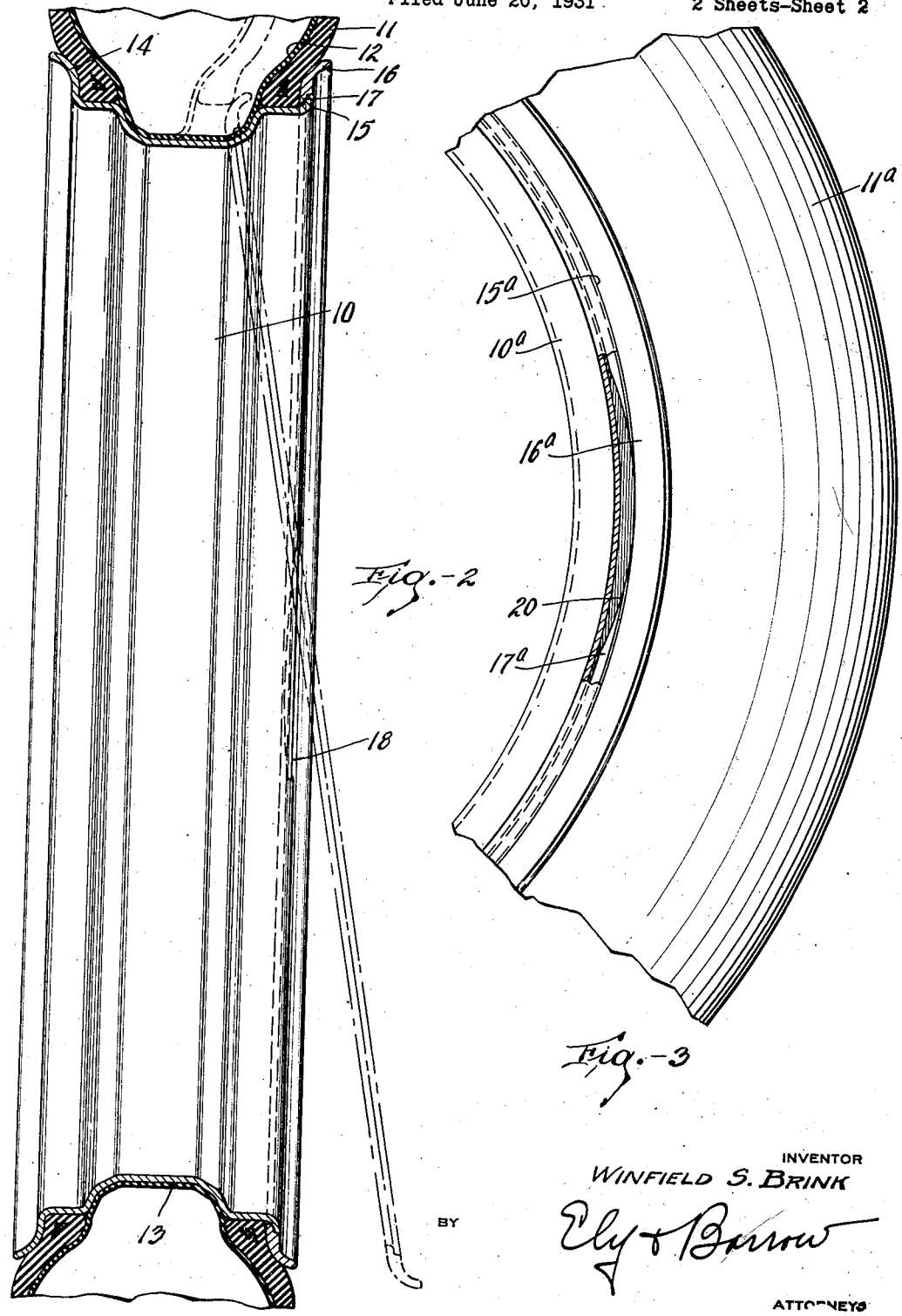
INVENTOR
WINFIELD S. BRINK
ATTORNEYS Patented July 4, 1939

2,164,984

UNITED STATES PATENT OFFICE 2,164,984

TIRE RIM

Winfield S. Brink, Akron, Ohio, assignor, by mesne assignments, to The Firestone Tire & Rubber Company, Akron, Ohio, a corporation of Ohio Application June 20, 1931, Serial No. 545,765

7 Claims. (Cl. 152—411)

This invention relates to tire rims of the drop center type, and has its primary utility in drop center rims which carry large size pneumatic tires, such as six inch tires and larger, which tires usually have rim diameters as small as 17 inches or 18 inches.

The chief objects of the invention are to facilitate the removal of tires from drop center rims; to provide for maintaining a standard well-depth in drop center rims of various sizes; and reduce the depth of the well in some sizes of drop center rims. Other objects will be manifest as the specification proceeds.

Of the accompanying drawings;

Figure 2 is a section on the line 2—2 of Figure 1; and

Figure 3 is a fragmentary side elevation of a modified form of the invention, a part thereof being in section.

Figure 1:
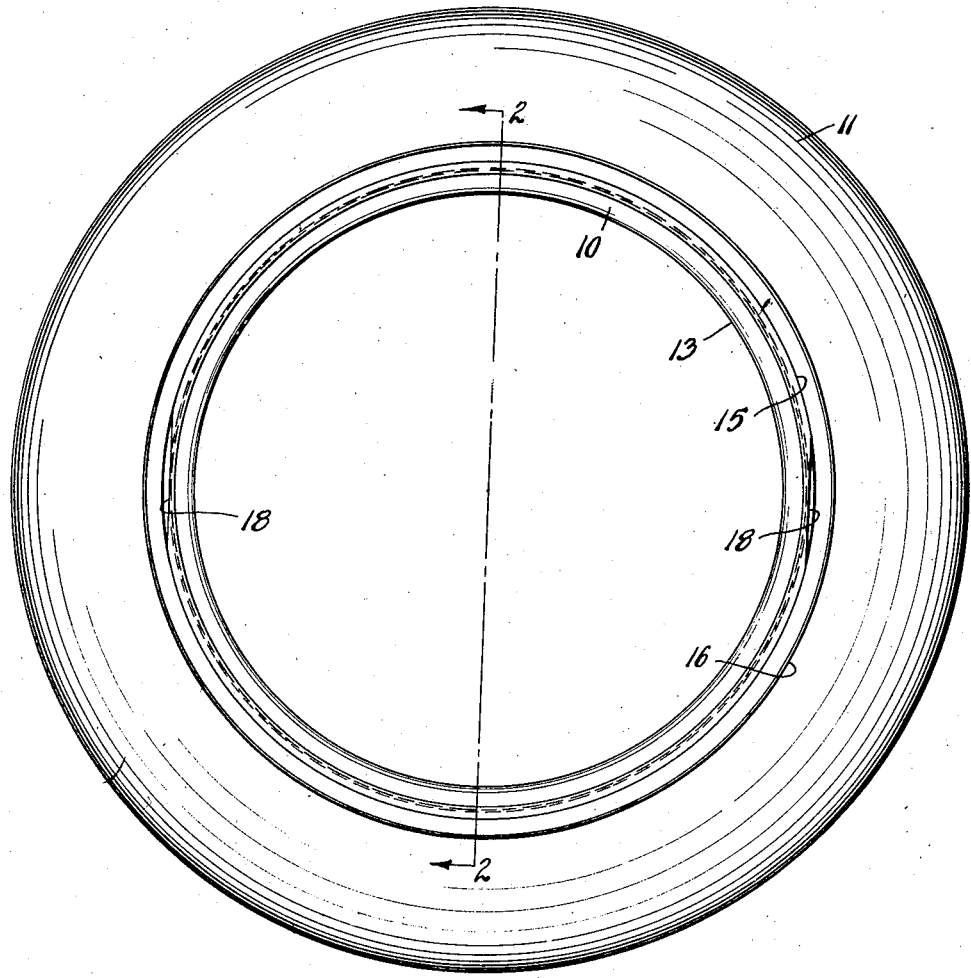
Figure 1 is a side elevation of a tire rim embodying the invention in its preferred form, and a tire thereon.

Referring to the drawings, 10 is an annular metal tire rim, 11 is a tire casing mounted thereupon, and 12 is the usual inflatable inner tube mounted within the tire casing 11. The rim 10 has the usual drop center characteristic consisting of a central, circumferential groove or well 13. One margin of the rim is formed with the usual integral outwardly extending tire-bead-retaining flange 14, and the other margin thereof is formed with a relatively low, outwardly directed flange 15 having minimum height of about ¼ inch. Mounted upon the flange 15 is an endless removabe side-ring 16 that is formed on its inner periphery with an inwardy extending flange 17 that is adapted to abut the inner lateral face of the rim-flange 15, normally being urged thereagainst by the pressure of an inflated tire 11. The cross-sectional profile of the ring 16 is substantially the same as that of the rim-flange 14. At diametrically opposite points 18, 18 the rim-flange 15 is cut away along lines that are tangent to the bead-seating portion of the rim.

The improved tire rim herein shown is for straight bead tires, but the invention is not limited to this type of rim since it is equally adaptable for rims for clincher tires. The rim may be demountable, or it may be used with wire or disc wheels. The removable ring 16 of course always is positioned on the outer side of the rim so as to permit the removal of the ring, and tire 11, from the rim.

In the operation of removing a tire from the rim, the tire is first partly or wholly deflated. The ring 16 and adjacent bead portion of the tire are then forced inwardly at a point 90 degrees removed from the cut-away regions 18, and the ring is allowed to drop into the well 13 of the rim as is most clearly shown in Figure 2, the ring thus moving to an eccentric position with relation to the rim whereby its opposite side is disposed well beyond the outer periphery of the rim-flange 15. The ring is then easily removed from the rim by laterally pulling the side thereof that projects beyond the rim, the cut-away regions 18 of the latter permitting the ring freely to pass the low rim-flange 15 without requiring springing or distorting of the ring.

After the ring 16 is removed, the tire 11 is easily removed from the rim, either by the usual method of utilizing the well of the rim, or simply by prying it over the low flange 15, the deflection of the bead of the tire required to get it over said flange being relatively slight.

The decrease in well-depth permitted by the construction shown effects sufficient saving of material substantially to balance the additional material required for the removable ring. The construction greatly facilitates the removal of large size tires from drop center rims, and accomplishes the other objects set out in the foregoing statement of objects.

Although the feature of the cut-away regions 18 greatly facilitates the removal of heavy rings 16, they are not entirely essential to the removal of light-weight rings since the latter may be sprung or distorted out of round so as to pass over the outer periphery of the low flange 15.

In Figure 3 is shown a modification of the invention consisting of a drop center tire rim 10a, and a removable ring 16a associated with the said tire rim, a pneumatic tire 11a being shown mounted upon the rim. The rim structure 10a is identical with the rim structure 10 except that its low lateral flange 15a is not tangentially cut away. The removable ring 16a is identical with the ring 16 of the preferred embodiment except that at two diametrically opposite regions its inwardly extending flange 17a is formed with arcuate recesses or concavities, such as the recess 20.

The ring 16a and tire 11a are removed from the rim 10a in the same manner as the ring and tire are removed from the rim in the preferred embodiment of the invention, the recesses 20 of the ring 16a permitting the latter easily to pass over the perimeter of the flange 15a without springing or distorting of the ring.

Other modifications are possible within the scope of the appended claims which are not limited wholly to the specific construction shown and described.

What is claimed is:

1. In a tire rim the combination of a drop center rim with an outer peripheral channel, said rim having an outer peripheral marginal flange of normal height on one side thereof and a relatively low outer peripheral marginal flange on the opposite side, and a removable ring mounted upon the rim beside the low flange, said ring being formed with diametrically opposed recesses on its inner periphery, each of said recesses extending for not more than one-fourth the inner circumference of said ring, each being constructed to span said low marginal flange in the removal from or application of the side ring over the low flange of the rim without unduly distorting said side ring, said spanning recesses serving to guide the side ring in its motion during removal from or application upon the rim, said drop center portion of the rim forming means into which the ring can be moved to permit said operations.

2. In a tire rim the combination of a drop center rim with an outer peripheral channel, said rim having an outer peripheral marginal flange of normal height on one side thereof and a relatively low outer peripheral marginal flange on the opposite side, and a removable ring mounted upon the rim beside the low flange, said ring being formed with a pair of diametrically opposed arcuate recesses on its inner periphery, each of said recesses extending for not more than one-fourth the inner circumference of said ring, each being constructed to span said low marginal flange in the removal from or application of the side ring over the low flange of the rim without unduly distorting said side ring, said spanning recesses serving to guide the side ring in its motion during removal from or application upon the rim, said drop center portion of the rim forming means into which the ring can be moved to permit said operations.

3. In a tire rim, the combination with a base having a peripheral channel therein, a peripherally extending tire retaining flange on one side of said base, a relatively low peripherally extending ring retaining member on the other side of said base, and a continuous ring member removably mounted on the rim beside said low ring retaining member, the normal inner diameter of said ring member being less than the outer diameter of said low ring retaining member, one of said members being cut away at substantially diametrically opposite points to form recesses, each of said recesses extending for not over one-quarter of the circumference of said ring member to permit said ring member to slip over said low ring retaining member when tilted at an angle to its normal position, said channel assisting the application of said ring member by permitting one side thereof to drop into same when said ring member is being applied.

4. In a tire rim the combination with a base having a peripheral channel therein, a peripherally extending tire retaining flange on one side of said base, a relatively low peripherally extending ring retaining member on the other side of said base, and a continuous ring member removably mounted on the rim beside said ring retaining member, the normal inner diameter of said ring member being less than the outer diameter of said low ring retaining member, said ring member being cut away at substantially diametrically opposite points to form recesses, each of said recesses extending for not over one-quarter of the circumference of said ring member, to permit said ring member to slip over said low ring retaining member when tilted at an angle to its normal position, said channel assisting the application of said ring member by permitting one side thereof to drop into same when said ring member is being applied.

5. In a tire rim, the combination with a base having a peripheral channel therein, a peripherally extending tire retaining flange on one side of said base, a relatively low peripherally extending ring retaining member on the other side of said base, and a continuous ring member removably mounted on the rim beside said low ring retaining member, the normal inner diameter of said ring member being less than the outer diameter of said low ring retaining member, one of said members being formed with diametrically opposed relieved areas, each of said relieved areas extending for not over one-quarter of the circumference of said ring member to permit said ring member to slip over said low ring retaining member when tilted at an angle to its normal position, said channel assisting the application of said ring member by permitting one side thereof to drop into same when said ring member is being applied.

6. In a tire rim the combination with a base having a peripheral channel therein, a peripherally extending tire retaining flange on one side of said base, a relatively low peripherally extending ring retaining member on the other side of said base, and a continuous ring member removably mounted on the rim beside said ring retaining member, the normal inner diameter of said ring member being less than the outer diameter of said low ring retaining member, said ring member being formed with recesses at substantially diametrically opposite points, each of said recesses extending for not over one-quarter of the circumference of said ring member, to permit said ring member to slip over said low ring retaining member when tilted at an angle to its normal position, said channel assisting the application of said ring member by permitting one side thereof to drop into same when said ring member is being applied.

7. In a tire rim, the combination with a base having a peripheral channel therein, a peripherally extending tire retaining flange on one side of said base, a relatively low peripherally extending ring retaining member on the other side of said base, and a continuous ring member removably mounted on the rim beside said low ring retaining member, the normal inner diameter of said ring member being less than the outer diameter of said low ring retaining member, said low ring retaining member being formed with diametrically opposed relieved areas, each of said relieved areas extending for not over one-quarter of the circumference of said ring-retaining member to permit said ring member to slip over said low ring-retaining member when tilted at an angle to its normal position, said channel assisting the application of said ring member by permitting one side thereof to drop into same when said ring member is being applied.

WINFIELD S. BRINK.